(12) United States Patent
Kim et al.

(10) Patent No.: US 9,606,383 B2
(45) Date of Patent: Mar. 28, 2017

(54) TRANSFLECTIVE IMAGE DISPLAY APPARATUS AND CONTROL METHOD THEREOF

(71) Applicant: SAMSUNG ELECTRONICS CO., LTD., Suwon-si (KR)

(72) Inventors: Dae-sik Kim, Hwaseong-si (KR); Seong-woo Cho, Suwon-si (KR); Sergey Shestak, Suwon-si (KR); Jong-hoon Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 137 days.

(21) Appl. No.: 14/168,055

(22) Filed: Jan. 30, 2014

(65) Prior Publication Data

US 2015/0015828 A1    Jan. 15, 2015

(30) Foreign Application Priority Data

Jul. 11, 2013  (KR) .......................... 10-2013-0081704

(51) Int. Cl.
 *G02F 1/1335* (2006.01)
 *G02F 1/133* (2006.01)
 (Continued)

(52) U.S. Cl.
 CPC ........ *G02F 1/13318* (2013.01); *G02F 1/1336* (2013.01); *G02F 1/13471* (2013.01);
 (Continued)

(58) Field of Classification Search
 CPC ......... G02F 1/133555; G02F 1/133536; G02F 2001/133531; G02F 1/133514
 See application file for complete search history.

(56) References Cited

U.S. PATENT DOCUMENTS 5,986,730 A * 11/1999 Hansen ............... G02F 1/13362
                                                        349/117
6,147,734 A   11/2000 Kashima
                    (Continued)

FOREIGN PATENT DOCUMENTS

EP         2538269 A1    12/2012
KR    20030081977 A      10/2003
                    (Continued)

OTHER PUBLICATIONS

Communication dated Sep. 22, 2014, issued by the European Patent Office in counterpart European Application No. 14152604.6.

*Primary Examiner* — Kendrick Hsu
(74) *Attorney, Agent, or Firm* — Sughrue Mion, PLLC

(57) ABSTRACT

A transflective image display apparatus includes a transmissive polarizing plate; a color filter disposed below the transmissive polarizing plate and including a white color filter and at least two of a red color filter, a green color filter, and a blue color filter; a liquid crystal display panel disposed below the color filter; an electrical polarization control unit disposed below the liquid crystal display panel; a reflective polarizing plate disposed below the electrical polarization control unit; a backlight unit disposed below the reflective polarizing plate and including a white light source and a light source configured to emit light corresponding to at least one of the red color filter, the green color filter, and the blue color filter; and a controller configured to control the liquid crystal display panel, the electrical polarization control unit, and the backlight unit periodically in at least two states according to a predetermined condition.

21 Claims, 11 Drawing Sheets

(51) Int. Cl.
   *G02F 1/1347* (2006.01)
   *G09G 3/34* (2006.01)
(52) U.S. Cl.
   CPC .. *G02F 1/133514* (2013.01); *G02F 1/133555*
   (2013.01); *G02F 1/133621* (2013.01); *G09G*
   *3/3413* (2013.01); *G02F 2001/133618*
   (2013.01); *G02F 2001/133622* (2013.01);
   *G02F 2001/133626* (2013.01); *G02F 2201/52*
   (2013.01); *G09G 2300/0456* (2013.01); *G09G*
   *2310/0235* (2013.01); *G09G 2320/062*
   (2013.01); *G09G 2320/064* (2013.01); *G09G*
   *2320/0666* (2013.01); *G09G 2360/144*
   (2013.01)

(56) References Cited

U.S. PATENT DOCUMENTS

| 7,656,476 | B2 | 2/2010 | So |
| 7,859,619 | B2 | 12/2010 | Jeong |
| 2005/0117096 | A1 | 6/2005 | Voloschenko et al. |
| 2009/0051849 | A1* | 2/2009 | Hwang ............... F21V 5/04 349/62 |
| 2010/0039587 | A1* | 2/2010 | Li ................ G09G 3/3406 349/68 |
| 2011/0164207 | A1 | 7/2011 | Arai et al. |
| 2011/0267381 | A1* | 11/2011 | Yamazaki ........... G09G 3/3607 345/690 |
| 2012/0062527 | A1* | 3/2012 | Cheong ............... G02F 1/1347 345/204 |
| 2012/0320308 | A1 | 12/2012 | Yeo et al. |
| 2013/0162934 | A1 | 6/2013 | Hirayama et al. |

FOREIGN PATENT DOCUMENTS

| KR | 1020040068778 A | 8/2004 |
| KR | 1020070111610 A | 11/2007 |
| KR | 1020080108770 A | 12/2008 |
| KR | 1020090114641 A | 11/2009 |
| KR | 102011004058 A | 1/2011 |
| KR | 1020110081069 A | 7/2011 |
| KR | 1020120046990 A | 5/2012 |

* cited by examiner

TRANSFLECTIVE IMAGE DISPLAY APPARATUS AND CONTROL METHOD THEREOF

CROSS-REFERENCE TO RELATED APPLICATIONS

This application claims priority from Korean Patent Application No. 10-2013-0081704 filed Jul. 11, 2013 in the Korean Intellectual Property Office, the disclosure of which is incorporated herein by reference in its entirety.

BACKGROUND

1. Field

Apparatuses and methods consistent with exemplary embodiments relate to an image display apparatus, and more particularly, to a transflective image display apparatus which can display images by transmitting or reflecting light and a control method thereof.

2. Description of the Related Art

Recently, liquid crystal display apparatuses have been widely used as image display apparatuses. Typical liquid crystal display apparatuses have an excellent image display capability, but use passive components that display images by using light emitted from a backlight unit instead of using active light emitting components.

FIG. 1 is a view schematically illustrating a structure of a typical liquid crystal display apparatus that displays images by using a backlight unit.

Referring to FIG. 1, a liquid crystal display apparatus 100 has a structure in which a first vertical linear polarizing plate 103, a liquid crystal display panel 102, and a second vertical linear polarizing plate 101 are stacked one after another on a backlight unit 104.

Non-polarized light W emitted from the backlight unit 104 changes to vertical linear polarized light while passing through the first vertical linear polarizing plate 103, and the vertical linear polarized light passes through the liquid crystal display panel 102. If a voltage is not applied to the liquid crystal display panel 102, as illustrated in FIG. 1, the vertical linear polarized light passes through the liquid crystal display panel 102 in the same state, and then also passes through the second vertical linear polarizing plate 101 with the same polarization direction in the same state so that a user will be able to see an image.

However, if the voltage is applied to the liquid crystal display panel 102, the vertical linear polarized light emitted from the first vertical linear polarizing plate 103 is changed to horizontal linear polarized light after passing through the liquid crystal display panel 102. The horizontal linear polarized light cannot pass through the second vertical linear polarizer 101 because the horizontal linear polarized light is not matched with the polarization direction of the second vertical linear polarizing plate 101. Accordingly, the liquid crystal display apparatus 100 does not display an image and looks dark to the user.

The transmissive liquid crystal display apparatus 100 using the backlight unit 104 always displays images by using the backlight unit 104 in which separate light sources are disposed. Therefore, there is a disadvantage that the liquid crystal display apparatus 100 has a large power consumption.

Accordingly, there is a need to develop a transflective liquid crystal display apparatus that can reduce power consumption by adaptively using a reflection mode and a transmission mode depending on the intensity of external light. When the external light is strong, as, for example, when a user is in bright sunlight, the transflective liquid crystal display apparatus uses the reflection mode in which it displays images by using the external light without using the backlight unit. When there is no external light, the liquid crystal display apparatus uses the transmission mode in which it displays images by using the backlight unit.

SUMMARY

The exemplary embodiments have been developed in order to overcome the above drawbacks and other problems associated with the related art display apparatuses. One of more exemplary embodiments relate to a transflective image display apparatus and a control method thereof that can reduce power consumption by adaptively using a transmission mode and a reflective mode depending on external light and can improve reflectance when used in the reflective mode.

According to an aspect of an exemplary embodiment, there is provided a transflective image display apparatus including a transmissive polarizing plate; a color filter disposed below the transmissive polarizing plate and including a white color filter and at least two of a red color filter, a green color filter, and a blue color filter; a liquid crystal display panel disposed below the color filter; an electrical polarization control unit disposed below the liquid crystal display panel; a reflective polarizing plate disposed below the electrical polarization control unit; a backlight unit disposed below the reflective polarizing plate and including a white light source and a light source configured to emit light corresponding to at least one of the red color filter, the green color filter, and the blue color filter which the color filter does not include; and a controller configured to control the liquid crystal display panel, the electrical polarization control unit, and the backlight unit periodically in at least two states according to a predetermined condition.

The controller may be configured to control the transflective image display apparatus so that at least two states of three states are executed periodically, the three states including: 1) a first state in which the electrical polarization control unit is operated so that incident polarized light is rotated by 90 degrees, the backlight unit does not emit light, and the liquid crystal display panel displays images, 2) a second state in which the electrical polarization control unit is not operated, the backlight unit emits white light, and the liquid crystal display panel displays images, and 3) a third state in which the electrical polarization control unit is not operated, the backlight unit emits light of a color corresponding to one of the red color filter, the green color filter, and the blue color filter which the color filter does not comprise, and the liquid crystal display panel displays images.

The transflective image display apparatus may include an illuminance sensor configured to measure brightness of a surrounding environment of the transflective image display apparatus and send a result of the measured brightness to the controller.

The controller may be configured to adjust a duty ratio of the first state, the second state, and the third state according to an amount of external light indicated by the result of the measured brightness that is measured by the illuminance sensor.

When the amount of the external light is equal to or greater than a first threshold, the controller may be configured to control the transflective image display apparatus so that the first state and the third state are executed periodically.

When the amount of the external light is between a first threshold and a second threshold which is lower than the first threshold, the controller may be configured to control the transflective image display apparatus so that the first state, the second state, and the third state are executed periodically.

When the amount of the external light is below a second threshold, the controller may be configured to control the transflective image display apparatus so that the second state and the third state are executed periodically.

The color filter may include a red color filter, a green color filter, and a white color filter, and the backlight unit may include a blue light source and the white light source.

The color filter may include a red color filter, a blue color filter, and a white color filter, and the backlight unit may include a green light source and the white light source.

The color filter may include a blue color filter, a green color filter, and a white color filter, and the backlight unit may include a red light source and the white light source.

The color filter may include a red color filter, a green color filter, a blue color filter, and a white color filter, and the backlight unit may include the white light source.

The controller may be configured to control the transflective image display apparatus so that two states are executed periodically, and the two states may include: 1) a first state in which the electrical polarization control unit is operated so that incident polarized light is rotated by 90 degrees, the backlight unit does not emit light, and the liquid crystal display panel displays images, and 2) a second state in which the electrical polarization control unit is not operated, the backlight unit emits white light, and the liquid crystal display panel displays images.

The transflective image display apparatus may include a lower transmissive polarizing plate disposed between the liquid crystal display panel and the electrical polarization control unit.

The backlight unit may include a diffusion member and a bright enhancement film.

The controller may include a state setting member configured to set a duty ratio of the first state, the second state, and the third state.

According to an aspect of another exemplary embodiment, there is provided a control method of a transflective image display apparatus, the control method including checking a setting condition; and controlling a liquid crystal display panel, an electrical polarization control unit, and a backlight unit so that at least two of a first state, a second state, and a third state are executed periodically according to the setting condition, wherein the first state, the second state, and the third state are states which control whether the backlight unit emits light towards the liquid crystal display panel and whether the electrical polarization control unit operates to change a polarization direction of light incident thereon.

The checking of the setting condition may include checking an amount of external light using an illuminance sensor.

The checking of the setting condition may include checking a setting value of a state setting member.

The first state may be a state in which the electrical polarization control unit is operated so that incident polarized light is rotated by 90 degrees, the backlight unit does not emit light, and the liquid crystal display panel displays images, the second state may be a state in which the electrical polarization control unit is not operated, the backlight unit emits white light, and the liquid crystal display panel displays images, and the third state may be a state in which the electrical polarization control unit is not operated, the backlight unit emits light of a color corresponding to one of a red color filter, a green color filter, and a blue color filter which the color filter does not comprise, and the liquid crystal display panel displays images.

BRIEF DESCRIPTION OF THE DRAWINGS

These and/or other aspects will become apparent and more readily appreciated from the following description of exemplary embodiments, taken in conjunction with the accompanying drawings of which.

Throughout the drawings, like reference numerals will be understood to refer to like parts, components and structures.

DETAILED DESCRIPTION OF THE EXEMPLARY EMBODIMENTS

Hereinafter, certain exemplary embodiments will be described in detail with reference to the accompanying drawings.

The matters defined herein, such as a detailed construction and elements thereof, are provided to assist in a comprehensive understanding of the exemplary embodiments. Thus, it is apparent that exemplary embodiments may be carried out without those defined matters. Also, well-known functions or constructions are omitted to provide a clear and concise description of exemplary embodiments. Further, dimensions of various elements in the accompanying drawings may be arbitrarily increased or decreased for assisting in a comprehensive understanding.

Figure 1:
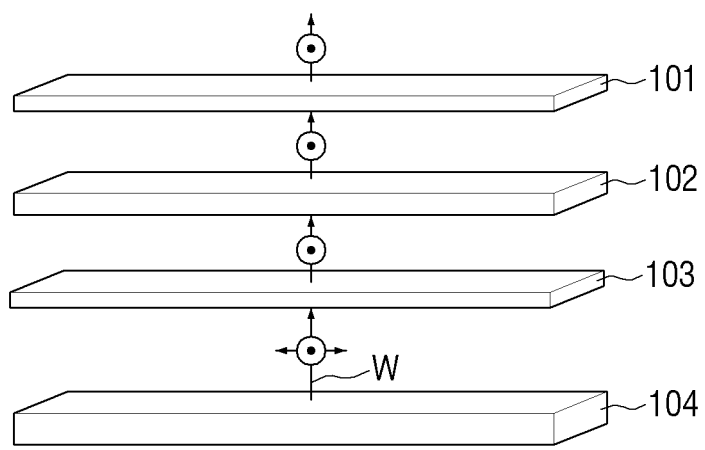
FIG. 1 is an exploded perspective view schematically illustrating a structure of a conventional liquid crystal display apparatus using a backlight unit.
Figure 2:
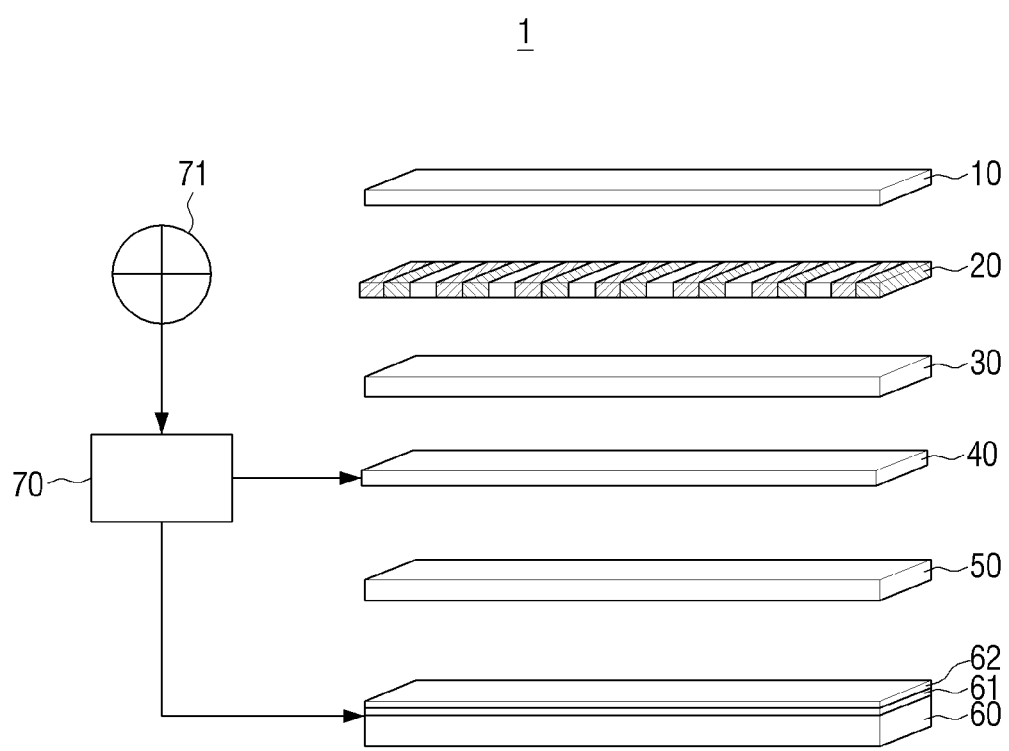
FIG. 2 is an exploded perspective view schematically illustrating a structure of a transflective image display apparatus according to an exemplary embodiment.

FIG. 2 is an exploded perspective view schematically illustrating a structure of a transflective image display apparatus according to an exemplary embodiment. In FIG. 2, components configuring the transflective image display apparatus are illustrated as being separate components spaced apart from each other, but this is for convenience of explanation and illustration, and the components are integrally combined in the order illustrated in FIG. 2 to form a single transflective image display apparatus.

Referring to FIG. 2, a transflective image display apparatus 1 according to an exemplary embodiment includes a transmissive polarizing plate 10, a color filter 20, a liquid crystal display panel 30, an electrical polarization control unit 40, a reflective polarizing plate 50, a backlight unit 60, and a controller 70.

The transmissive polarizing plate 10 is disposed at the top of the transflective image display apparatus 1, and changes external light having no polarization into polarized light. The transmissive polarizing plate 10 may be formed to allow either vertical linear polarized light or horizontal linear polarized light to pass therethrough. The present exemplary embodiment uses the transmissive polarizing plate 10 through which only the vertical linear polarized light can pass. Accordingly, after passing through the transmissive polarizing plate 10, the external light is changed to the vertical linear polarized light.

The color filter 20 is placed below the transmissive polarizing plate 10, and includes a white color filter and at least two of a red color filter, a green color filter, and a blue color filter. The white color filter allows all visible wavelength bands of light to pass therethrough, and functions in the same way as if there is no color filter. Accordingly, the white color filter may also be referred to as a transparent filter. In general, when the light passes through the red color filter, the green color filter, and the blue color filter, there is light loss. However, when the light passes through the white color filter, there is very small light loss as compared to the red color filter, the green color filter, and the blue color filter. Accordingly, the color filter 20 including the white color filter as in the present exemplary embodiment has good light transmittance compared to color filters including no white color filter.

The liquid crystal display panel 30 is placed below the color filter 20, and displays images according to the control of the controller 70. The liquid crystal display panel 30 may have the same configuration as a conventional liquid crystal display panel; therefore, a detailed description thereof will be omitted.

The electrical polarization control unit 40 is disposed below the liquid crystal display panel 30. The electrical polarization control unit 40 can be electrically controlled to allow the incident linear polarized light to pass therethrough in a state rotated by 90 degrees or in the same state as the incident state. For example, the electrical polarization control unit 40 may rotate the vertical linear polarized light by 90 degrees to form the horizontal linear polarized light, rotate the horizontal linear polarized light by 90 degrees to form the vertical linear polarized light, or allow the polarized light (the vertical linear polarized light and the horizontal linear polarized light) to pass therethrough without rotating the polarized light 90 degrees according to control of the controller 70. The electrical polarization control unit 40 may be implemented as a liquid crystal panel, although is not limited thereto.

In the present exemplary embodiment, if the controller 70 applies a voltage to the electrical polarization control unit 40, the electrical polarization control unit 40 rotates the incident vertical or horizontal linear polarized light by 90 degrees to form the horizontal or vertical linear polarized light. Also, if the controller 70 does not apply the voltage to the electrical polarization control unit 40, the incident vertical and horizontal linear polarized light passes through the electrical polarization control unit 40 in the same state.

Figure 8:
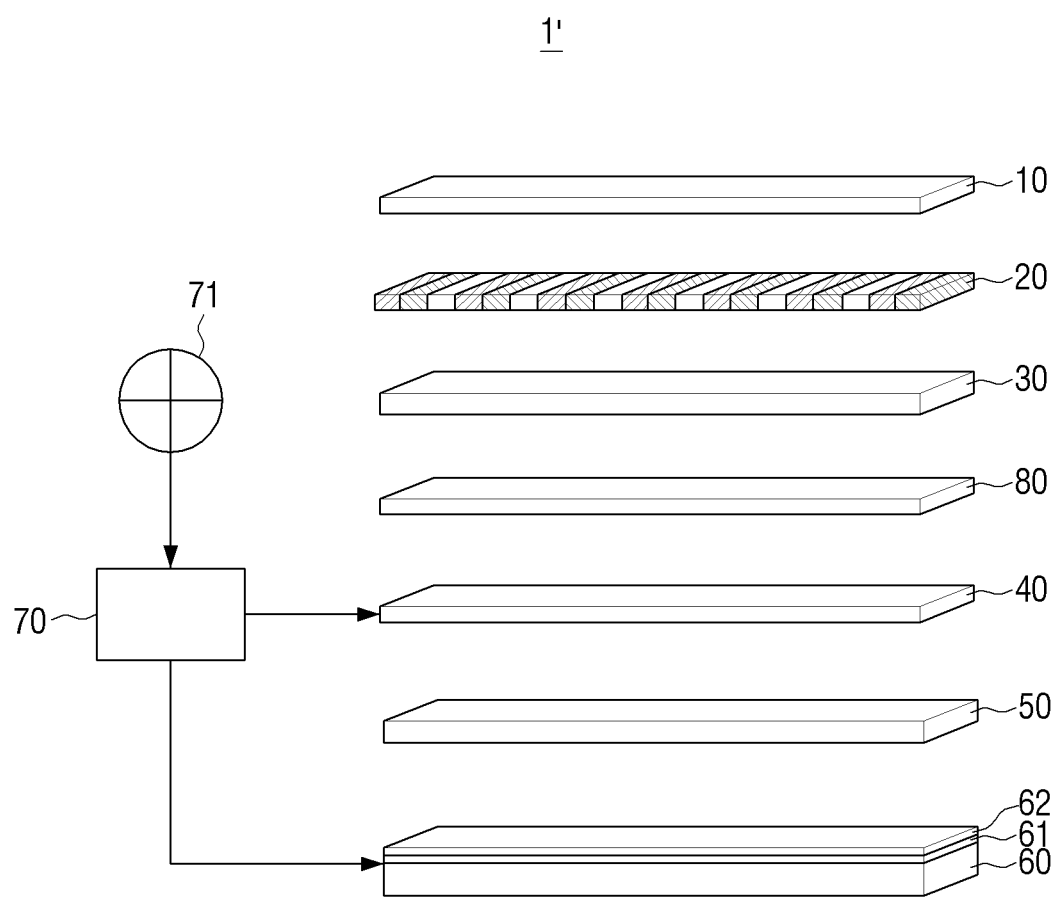
FIG. 8 is an exploded perspective view schematically illustrating a transflective image display apparatus according to another exemplary embodiment.

In the above description, the electrical polarization control unit 40 is disposed directly below the liquid crystal display panel 30. Alternatively, according to other exemplary embodiments, a lower transmissive polarizing plate 80 may be disposed between the liquid crystal display panel 30 and the electrical polarization control unit 40, as shown, for example, in a transflective image display apparatus 1' illustrated in FIG. 8. The lower transmissive polarizing plate 80 may have the same configuration as the above-described transmissive polarizing plate 10; therefore, a detailed description thereof will be omitted.

The reflective polarizing plate 50 is disposed below the electrical polarization control unit 40. The reflective polarizing plate 50 may reflect some of the polarized light and allow the remaining light of the polarized light to pass therethrough. For example, the reflective polarizing plate 50 may be formed so that it reflects the vertical linear polarized light and allows the horizontal linear polarized light to pass therethrough. As another example, the reflective polarizing plate 50 may be formed so that the reflective polarizing plate 50 reflects the horizontal linear polarized light and allows the vertical linear polarized light to pass therethrough. In the present exemplary embodiment, the reflective polarizing plate 50 is formed so that the reflective polarizing plate 50 reflects the horizontal linear polarized light and allows the vertical linear polarized light to pass therethrough.

The backlight unit 60 is disposed below the reflective polarizing plate 50, and includes a plurality of light sources to emit light to the liquid crystal display panel 30. The backlight unit 60 includes a white light source and light sources corresponding to the above-described color filter 20. In other words, the backlight unit 60 may include light sources to emit light corresponding to one of the red color filter, the green color filter, and the blue color filter which the color filter 20 does not include.

For example, if the color filter 20 includes the red color filter, the green color filter, and the white color filter, the backlight unit 60 may include a blue light source to emit blue light corresponding to the blue color filter which is not included in the color filter 20, and may further include a white light source to emit white light. As another example, if the color filter 20 includes the red color filter, the blue color filter, and the white color filter, the backlight unit 60 may be configured to include a green light source and the white light source. Also, as another example, if the color filter 20 includes the blue color filter, the green color filter, and the white color filter, the backlight unit 60 may be configured to include a red light source and the white light source. Further, as another example, if the color filter 20 includes the red color filter, the green color filter, the blue color filter, and the white color filter, the backlight unit 60 may be configured to include the white light source.

In addition, the backlight unit 60 may include the same components as those of the conventional backlight unit. For example, the backlight unit 60 may include a diffusion member 61 to diffuse the light emitted from the light sources and a bright enhancement film (BEF) 62 to improve the brightness. Also, the backlight unit 60 may include a λ/4 film. The diffusion member 61 may include a diffusion sheet and a diffusion plate.

Also, the backlight unit 60 may use a direct-lit backlight unit in which a plurality of light sources is disposed on the bottom surface of the backlight unit 60 directly below the liquid crystal display panel 30 or may use an edge-lit backlight unit in which the plurality of light sources is disposed at opposite sides of the backlight unit 60 and light is guided to the liquid crystal display panel 30 through a light guiding plate as needed. Since an arrangement of the plurality of light sources may be changed depending on the type of the backlight unit 60 and the arrangement of the plurality of light sources may be implemented in substantially the same way as the conventional backlight unit, a detailed description thereof is omitted. However, it is noted that the plurality of light sources is disposed inside the backlight unit 60. According to an exemplary embodiment, the plurality of light sources includes white light sources and light sources to emit light having a color corresponding to a filter that is not contained in the color filter 20.

The controller 70 controls the liquid crystal display panel 30, the electrical polarization control unit 40, and the backlight unit 60 to display a predetermined image. A method in which the controller 70 controls the liquid crystal display panel 30 may be the same as or similar to that of a conventional controller; therefore, a detailed description thereof will be omitted.

Next, a detailed description of how the controller 70 controls the electrical polarization control unit 40 and the backlight unit 60 is provided. The controller 70 controls the electrical polarization control unit 40 and the backlight unit 60 depending on the brightness of the external light, thereby minimizing power consumption of the transflective image display apparatus 1 and improving the visibility thereof in the outdoors. In other words, the controller 70 may apply a voltage to the electrical polarization control unit 40, and control operations to turn the white light sources and the other light sources on and off, to emit light having a color corresponding to a filter that is not contained in the color filter 20 or the brightness of the light.

The controller 70 may control the transflective image display apparatus 1 so that at least two of three following states are executed periodically. The three following states include:

1) a first state in which the electrical polarization control unit 40 is operated so that the incident polarized light is rotated by 90 degrees, the backlight unit 60 does not emit light, and the liquid crystal display panel 30 displays images (this state may also be referred to as a reflection mode), 2) a second state in which the electrical polarization control unit 40 is not operated, the backlight unit 60 emits light, and the liquid crystal display panel 30 displays images (this state may also be referred to as a white light emitting mode, which is a type of transmission mode), and 3) a third state in which the electrical polarization control unit 40 is not operated, the backlight unit 60 emits light corresponding to one of the red color filter, the green color filter, and the blue color filter which the color filter 20 does not include, and the liquid crystal display panel 30 displays images (this state may also be referred to as a complementary color light emitting mode, which is a type of transmission mode).

For example, in a case in which the color filter 20 includes the red color filter, the green color filter, and the white color filter and the backlight unit 60 is configured to include the white light source and the blue light source, in the first state, the backlight unit 60 does not emit any light. In the second state, the backlight unit 60 emits white light by operation of only the white light source. In the third state, the backlight unit 60 emits blue light.

As another example, in a case in which the color filter 20 includes the red color filter, the green color filter, the blue color filter, and the white color filter and the backlight unit 60 is configured to include only the white light source, the third state among the three states as described above is not necessary. Therefore, the controller 70 controls the electrical polarization control unit 40 and the backlight unit 60 so that only the first state and the second state are executed.

The controller 70 may adaptively control the first, second and third states as described above depending on the brightness of the external light. In other words, depending on an amount of the external light, the controller 70 may properly adjust the duty ratio of the transmission mode and the reflection mode. In detail, to achieve reproduction of the desired color and brightness, the controller 70 may adjust a voltage of each pixel of the liquid crystal display panel 30 and the brightness of the white light source and the blue light source in each of the first state, the second state, and the third state. Also, the controller 70 may adjust the cycle and the operation time percentage of each of the first, second, and third states. If the outside is very bright, the controller 70 may reproduce desired colors with only the first and third states without use of the second state. If the outside is relatively dark, the controller 70 reinforces the brightness which the first state lacks with the second state, and compensates the blue color with the third state. For example, if the first state is used at 80% in the transflective image display apparatus 1, the second state may be used at 20%. Alternatively, if the first state is used at 40% in the transflective image display apparatus 1, the second state may be used at 60%. If only a small amount of the external light is present, the controller 70 may display images by using only the second and third states without the usage of the first state.

In detail, when the transflective image display apparatus 1 is used in a place where there is sufficient external light which is equal to or greater than a predetermined first threshold (e.g. where sunlight is strong, where the artificial lighting is very bright, such as a department store, etc.), the controller 70 may control the transflective image display apparatus 1 so that the first state and the third state are executed sequentially and periodically. In other words, the controller 70 controls the transflective image display apparatus 1 so that the transflective image display apparatus 1 maintains the first state for a certain period of time, is changed to the third state, and then maintains the third state for a certain period of time. After that, the controller 70 controls the transflective image display apparatus 1 so that the transflective image display apparatus 1 is again changed to the first state, and then maintains the first state for a certain period of time. The controller 70 controls the transflective image display apparatus 1 to perform the above process repeatedly.

When the transflective image display apparatus 1 is used in a place in which an amount of external light is small such that the amount of external light is between the predetermined first threshold and a predetermined second threshold lower than the predetermined first threshold (e.g., outdoors in the shade, indoors under a fluorescent light, outdoors on a cloudy day, etc.), the controller 70 controls the transflective image display apparatus 1 so that the first state, the second state, and the third state are executed sequentially and periodically. In other words, the controller 70 may sequentially repeat the first state, the second state, and the third state over a certain period of time.

Also, when the transflective image display apparatus 1 is used in a place in which an amount of the external light is very little or does not exist at all and as such is below the predetermined second threshold (for example when the transflective image display apparatus 1 is used in indoors where the lighting is turned off, in a darkroom with no lighting, outdoors at night, etc.) the controller 70 controls the transflective image display apparatus 1 so that the second state and the third state are executed sequentially and periodically.

As described above, the controller 70 may appropriately set the duty ratio of the first state, the second state, and the third state depending on the brightness of the external light source. Table 1 shows an example of the duty ratio of the first state, the second state, and the third state that may be set by the controller 70.

TABLE 1

| situation | First state duty | | brightness | Second state duty | | brightness | Third state duty | | brightness | Sum of duty | | Sum of brightness |
|---|---|---|---|---|---|---|---|---|---|---|---|---|
| Under sunlight | 0.7 | R | 360 | 0 | R | 0 | 0.3 | R | 0 | 1 | R | 360 |
|  |  | G | 360 |  | G | 0 |  | G | 0 |  | G | 360 |
|  |  | B | 90 |  | B | 0 |  | B | 270 |  | B | 360 |
| shade | 0.7 | R | 240 | 0.15 | R | 120 | 0.15 | R | 0 | 1 | R | 360 |
|  |  | G | 240 |  | G | 120 |  | G | 0 |  | G | 360 |
|  |  | B | 60 |  | B | 30 |  | B | 270 |  | B | 360 |
| fluorescent | 0.2 | R | 20 | 0.60 | R | 340 | 0.15 | R | 0 | 1 | R | 360 |
|  |  | G | 20 |  | G | 340 |  | G | 0 |  | G | 360 |
|  |  | B | 5 |  | B | 85 |  | B | 270 |  | B | 360 |
| Dark room | 0 | R |  | 0.85 | R | 360 | 0.15 | R | 0 | 1 | R | 360 |
|  |  | G |  |  | G | 360 |  | G | 0 |  | G | 360 |
|  |  | B |  |  | B | 90 |  | B | 270 |  | B | 360 |

In the second state of Table 1, it is shown that the brightness of the white light provided by the backlight unit 60 changes depending on the brightness of the external light source. As described above, the controller 70 may properly adjust the brightness of the white light depending on the brightness of the external light source. Accordingly, in the case of the second state, if the power consumed by the backlight unit 60 is 480 per one second in the shade, the power consumed by the backlight unit 60 is 340 per one second in the fluorescent light.

Also, in the first state of the Table 1, it is shown that even though the duty is the same under sunlight and in the shade, the brightness is different in the sunlight as compared to the shade. This is because the external light is weak in the shade as compared to under sunlight so that an amount of reflected light is small.

The duty ratios of the first state, the second state, and the third state in Table 1 are only examples, and exemplary embodiments are not limited thereto. The controller 70 may set the duty ratio variously depending on the amount of the external light. For example, the controller 70 may set the duty ratio of the first state; second state; and third state variously such as: 0.8; 0; 0.2, 0.6; 0.25; 0.15, 0.4; 0.45; 0.15, etc. The amount of external light that is a standard by which the controller 70 determines the duty ratio may be determined relatively. Accordingly, if it is defined that a first light quantity is the amount of light where there is sufficient external light, a second light quantity is the amount of light where there is a small amount of external light, and a third light quantity is the amount of light where there is very little or no external light, it may be determined so that the first light quantity is greater than the second light quantity and the second light quantity is greater than the third light quantity. At this time, values of the first, second and third light quantities may be determined arbitrarily according to the structure of the transflective image display apparatus 1, the brightness of the screen which a user desires, etc.

Figure 10:
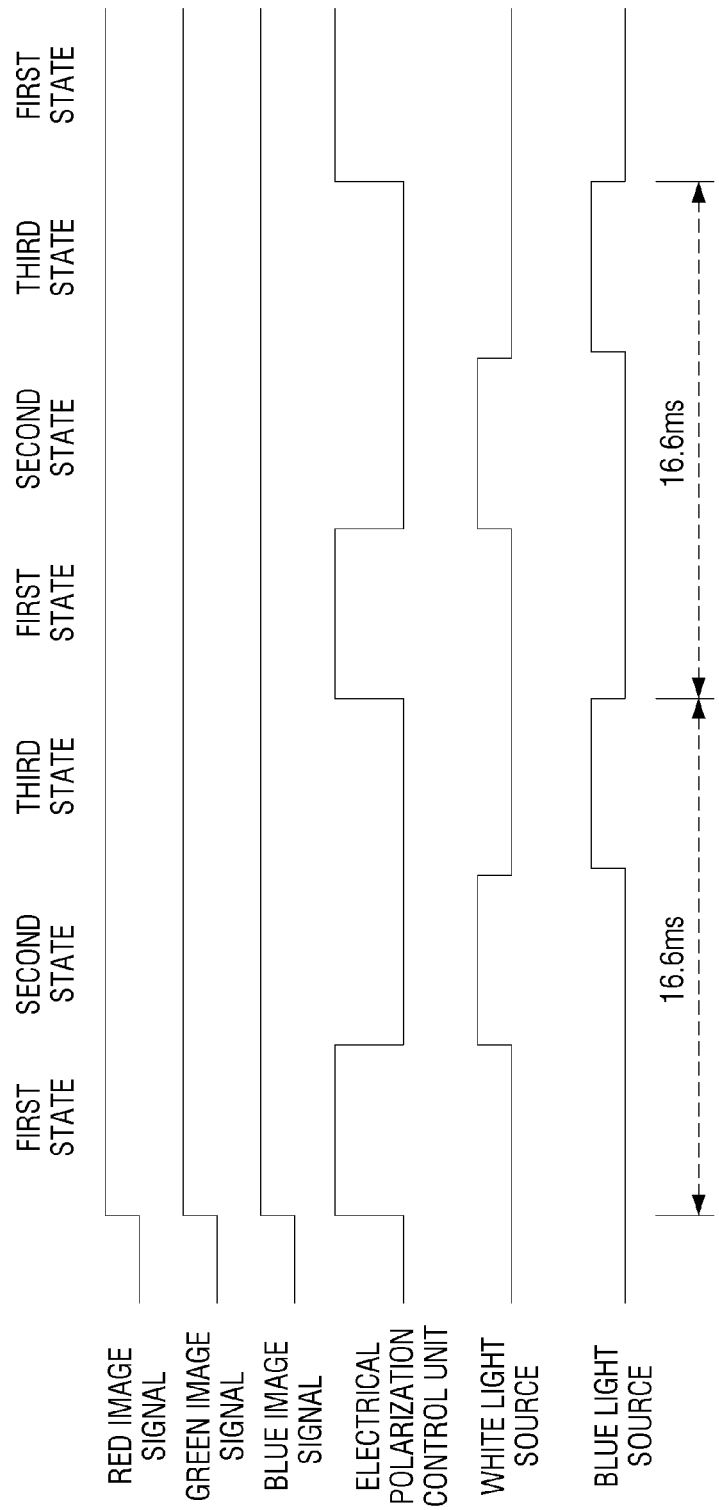
FIG. 10 is a view illustrating an example of operating waveforms of a transflective image display apparatus according to an exemplary embodiment.

Further, when the controller 70 controls the transflective image display apparatus 1 according to Table 1, one example of operation signals of the electrical polarization control unit 40 and the white light source and the blue light source of the backlight unit 60 for the liquid crystal display panel 30 operating at 60 Hz is illustrated in FIG. 10. Referring to FIG. 10, the first state, the second state, and the third state are repeated periodically within the image signal operating at 60 Hz. According to the example shown in FIG. 10, the duty ratios of the first state, the second state, and the third state may vary.

According to another exemplary embodiment, the controller 70 may control the transflective image display apparatus 1 as follows.

A first state is controlled in the same way as the above-described exemplary embodiment. In a second state, the controller 70 controls the backlight unit 60 to emit white light. At this time, the controller 70 controls the liquid crystal display panel 30 so that only pixels corresponding to a red color and a green color pass light and pixels corresponding to a blue color do not pass the light. In other words, the controller 70 controls the liquid crystal display panel 30 so that the liquid crystal display panel 30 allows red light and green light to pass therethrough and blocks blue light. This feature may be implemented in various ways, for example, by using liquid crystal display (LCD) technology known to those skilled in the art. In a third state, the controller 70 controls the backlight unit 60 to emit the blue light. At this time, the controller 70 controls the liquid crystal display panel 30 so that the pixels corresponding to the red color and the green color do not pass the light and only the pixels corresponding to the blue color pass the light. In other words, the controller 70 controls the liquid crystal display panel 30 so that the liquid crystal display panel 30 blocks the red light and the green light and allows only the blue light to pass therethrough. Accordingly, it may be easy to calculate an intensity of a blue signal that is required to compensate for the blue color that is insufficient in the first state and the second state. When such an operation is performed, duty and brightness are shown in Table 2.

TABLE 2

| situation | First state duty | | First state brightness | Second state duty | | Second state brightness | Third state duty | | Third state brightness | Sum of duty | | Sum of brightness |
|---|---|---|---|---|---|---|---|---|---|---|---|---|
| Under sunlight | 0.7 | R | 360 | 0 | R | 0 | 0.3 | R | 0 | 1 | R | 360 |
| | | G | 360 | | G | 0 | | G | 0 | | G | 360 |
| | | B | 90 | | B | 0 | | B | 270 | | B | 360 |
| shade | 0.7 | R | 240 | 0.15 | R | 120 | 0.15 | R | 0 | 1 | R | 360 |
| | | G | 240 | | G | 120 | | G | 0 | | G | 360 |
| | | B | 60 | | B | 0 | | B | 300 | | B | 360 |
| fluorescent | 0.2 | R | 20 | 0.60 | R | 340 | 0.15 | R | 0 | 1 | R | 360 |
| | | G | 20 | | G | 340 | | G | 0 | | G | 360 |
| | | B | 5 | | B | 0 | | B | 355 | | B | 360 |
| Dark room | 0 | R | | 0.85 | R | 360 | 0.15 | R | 0 | 1 | R | 360 |
| | | G | | | G | 360 | | G | 0 | | G | 360 |
| | | B | | | B | 0 | | B | 360 | | B | 360 |

Figure 11:
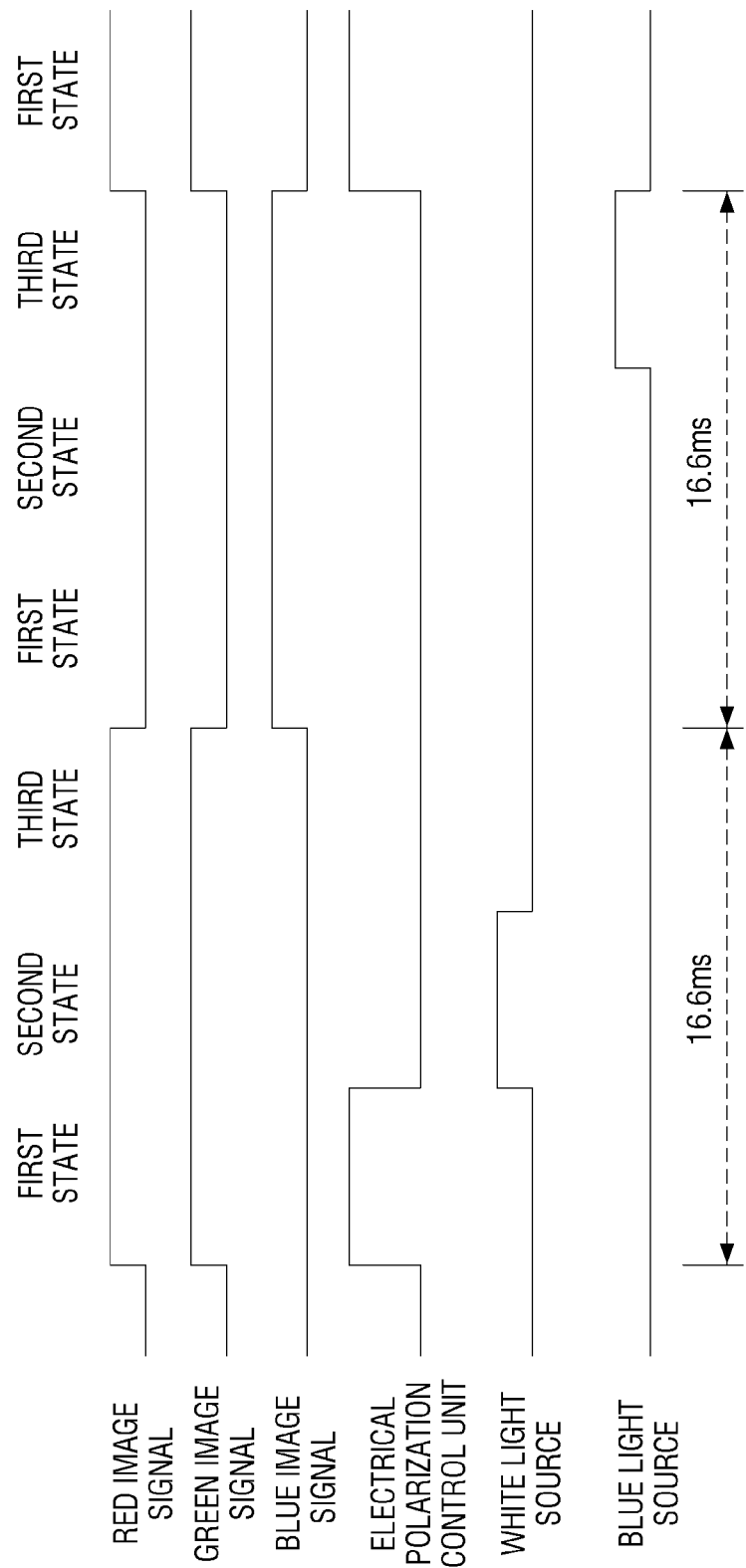
FIG. 11 is a view illustrating another example of operating waveforms of a transflective image display apparatus according to an exemplary embodiment.

When the controller 70 controls the transflective image display apparatus 1 according to Table 2, one example of operation signals of the electrical polarization control unit 20 40 and the white light source and the blue light source of the backlight unit 60 to generate image signals of the liquid crystal display panel 30 is illustrated in FIG. 11. When the transflective image display apparatus 1 is controlled according to Table 2, the controller 70 may control the transflective image display apparatus 1 in a variety of operation waveforms in addition to the operation waveforms as illustrated in FIG. 11.

Referring to FIG. 11, to make it easier to compensate for the color, one frame is used for the red image signal and the green image signal and one frame is used for the blue image signal so that a total of two frames are used to display the red image signal, the green image signal, and the blue image signal. In this case, the operation frequency of the liquid crystal display panel 30 becomes 30 Hz. In FIG. 11, the electrical polarization control unit 40 operates in the first-time first state (the first occurrence of the first state), and does not operate in the second-time first state (the second occurrence of the first state). However, according to another exemplary embodiment, the electrical polarization control unit 40 may be controlled to operate in both the first-time and second-time first state. The white light source of the backlight unit 60 operates in the first-time second state, and does not operate in the second-time second state. Also, the blue light source of the backlight unit 60 does not operate in the first-time third state, and operates in the second-time third state.

The controller 70 may detect the brightness of the external light automatically or manually. When the brightness of the external light is detected automatically, the controller 70 is electrically connected to an illuminance sensor 71. The illuminance sensor 71 measures the brightness of the surrounding environment of the transflective image display apparatus 1, and then sends a signal including the measurement result to the controller 70. Then, the controller 70 may properly control the display state of the transflective image display apparatus 1 based on the signal received from the illuminance sensor 71.

As another example, the controller 70 enables the display state of the transflective image display apparatus 1 to be controlled manually by the user depending on the external light. If the display state of the transflective image display apparatus 1 is controlled manually, a state setting member may be connected to the controller 70.

Figure 9:
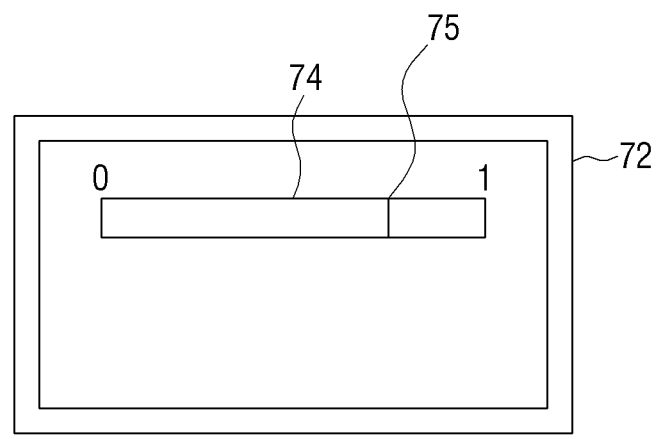
FIG. 9 is a view illustrating a state setting member that is used in a transflective image display apparatus according to an exemplary embodiment.

The state setting member enables the user to properly set the duty ratio of the first state, the second state, and the third state, and may be implemented as hardware such as a variable resistor. Alternatively or in addition to implementing the state setting member as hardware, as illustrated in FIG. 9, the state setting member may be implemented as software such as an adjusting bar 74 that is output on a display unit 72 of the controller 70 and can be used to adjust the display state of the transflective image display apparatus 1. If the state setting member is implemented as illustrated in FIG. 9, the user may adjust the duty ratio of the first state, the second state, and the third state by touching and adjusting the adjusting bar 74. For example, in FIG. 9, one end point of zero (0) of the adjusting bar 74 may be used to set the reflection mode of the transflective image display apparatus 1, and the other end point of one (1) of the adjusting bar 74 may be used when the transflective image display apparatus 1 is used in a dark place where there is no light, such as a darkroom. In this case, since opposite ends of the adjusting bar 74 and the duty ratio of each of the first state, the second state, and the third state are set in advance, the duty ratio of each of the first state, the second state, and the third state may be changed based on adjusting a position of a moving line 75 of the adjusting bar 74. It is understood that the adjusting bar 74 and moving line 75 are exemplary only, and many different types of symbols, icons, or other visual and/or audio features which enable a user to manually set the duty ratio of the first state, the second state, and the third state adjust may be used according to other exemplary embodiments.

Hereinafter, an operation of the transflective image display apparatus 1 according to an exemplary embodiment having the structure as described above will be described with reference to FIGS. 3, 4 and 5.

Figure 3:
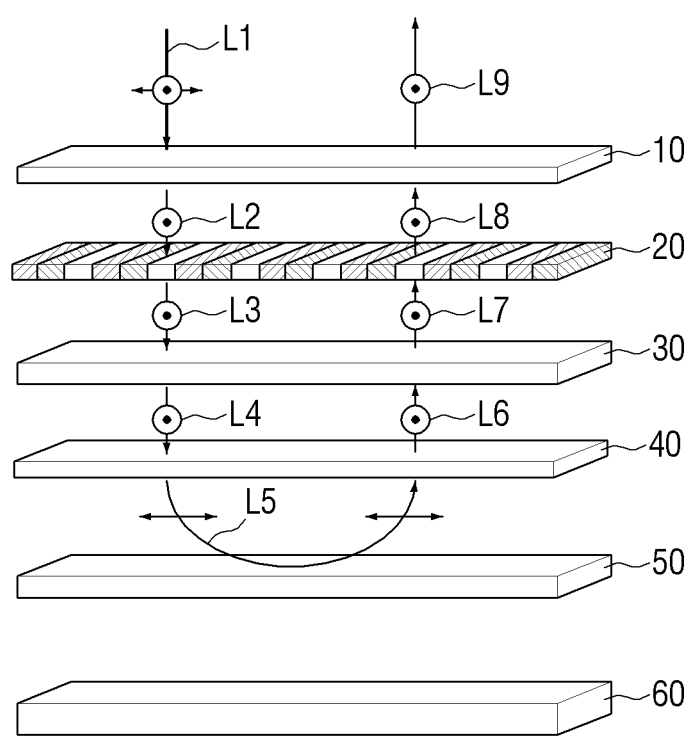
FIG. 3 is an exploded perspective view illustrating the transflective image display apparatus of FIG. 2 operating in a first state.
Figure 4:
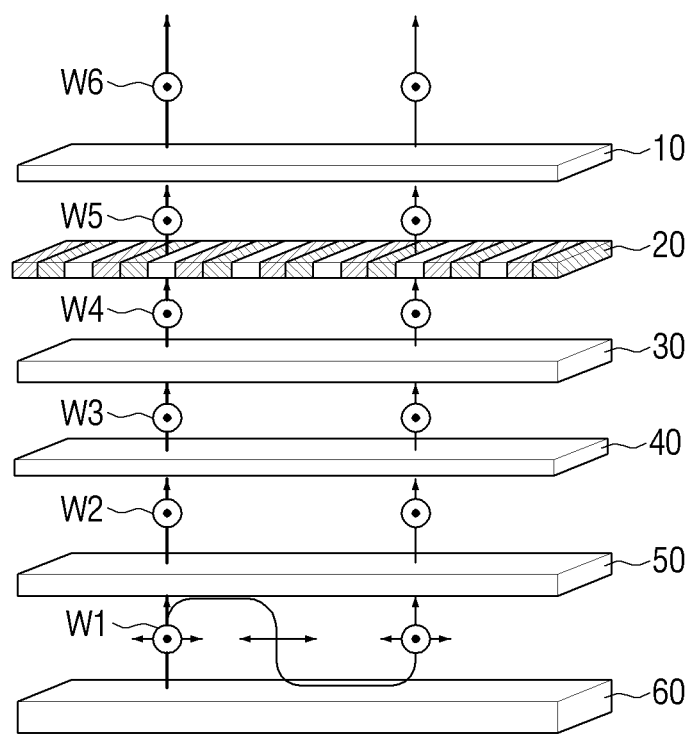
FIG. 4 is an exploded perspective view illustrating the transflective image display apparatus of FIG. 2 operating in a second state.
Figure 5:
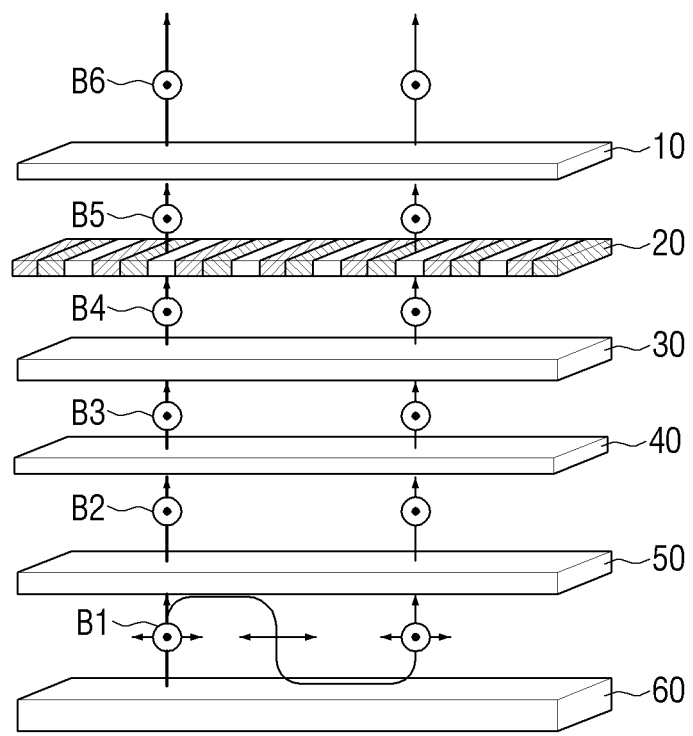
FIG. 5 is an exploded perspective view illustrating the transflective image display apparatus of FIG. 2 operating in a third state.

FIG. 3 is an exploded perspective view illustrating the transflective image display apparatus of FIG. 2 which operates in a first state. FIG. 4 is an exploded perspective view illustrating the transflective image display apparatus of FIG. 2 which operates in a second state. FIG. 5 is an exploded perspective view illustrating the transflective image display apparatus of FIG. 2 which operates in a third state. In FIGS. 3, 4, and 5, a circle inside of which is a point is a symbol that represents vertical linear polarized light, a short straight line with arrows at the opposite ends thereof is a symbol which represents horizontal linear polarized light, and a circle inside of which is a point and which has arrows at opposite sides thereof is a symbol that represents non-polarized light including the vertical linear polarized light and the horizontal linear polarized light.

First, in a case of the first state, the operation of the transflective image display apparatus 1 will be described with reference to FIG. 3.

In the first state, the backlight unit 60 is not operated, and the transflective image display apparatus 1 operates in the reflection mode by using the external light. Since the transmissive polarizing plate 10 allows only the vertical linear polarized light to pass therethrough, the light L1 that enters the transmissive polarizing plate 10 from the outside is the non-polarized light, but, after passing through the transmissive polarizing plate 10, the light L2 becomes the vertical linear polarized light. The vertical linear polarized light L2 passes through the color filter 20, and then is incident on the liquid crystal display panel 30 in the state of the vertical linear polarized light (L3). Since the color filter 20 has a white color filter, a red color filter, and a green color filter, the light transmission is better than that of a color filter including a red color filter, a green color filter, and a blue color filter. Therefore, the visibility thereof may be improved.

After passing through the liquid crystal display panel 30, the vertical linear polarized light is incident on the electrical polarization control unit 40 (L4). At this time, since a voltage is applied to the electrical polarization control unit 40 by the controller 70, the vertical linear polarized light L4 that is incident on the electrical polarization control unit 40 is rotated by 90 degrees while passing through the electrical polarization control unit 40, thereby being changed to the horizontal linear polarized light L5 and entering the reflective polarizing plate 50. Since the reflective polarizing plate 50 allows only the vertical linear polarized light to pass therethrough, the horizontal linear polarized light L5 that is incident on the reflective polarizing plate 50 is reflected back and incident on the electrical polarization control unit 40. The horizontal linear polarized light that is incident on the electrical polarization control unit 40 is rotated by 90 degrees while passing through the electrical polarization control unit 40, thereby being changed to the vertical linear polarized light and entering the liquid crystal display panel 30 (L6). The vertical linear polarized light L6 passes sequentially through the liquid crystal display panel 30, the color filter 20, and the transmissive polarizing plate 10 so that the user will be able to see an image. However, in the first state, since the color filter 20 is not equipped with the blue color filter, there is a problem that the brightness of the blue color is weak compared to the brightness of the red and green colors in the playback images. For solving this problem, in the first state of the reflection mode, the third state may be executed periodically to enhance the brightness of the blue color.

Next, an operation of the transflective image display apparatus 1 in the second state will be described with reference to FIG. 4.

In the second state, the white color source of the backlight unit 60 is used. The white color source is used to improve the brightness which is insufficient in the second state. The non-polarized light W1 is emitted from the white light source of the backlight unit 60 to be incident on the reflective polarizing plate 50. Some polarized light of the non-polarized light W1 that is matched with the polarization direction of the reflective polarizing plate 50 passes through the reflective polarizing plate 50, and then moves toward the electrical polarization control unit 40. According to the present exemplary embodiment, since the reflective polarizing plate 50 allows only the vertical linear polarized light to pass therethrough, the light W2 that has passed through the reflective polarizing plate 50 is the vertical linear polarized light, and the horizontal linear polarized light of the non-polarized light W1 is reflected to the backlight unit 60 by the reflective polarizing plate 50. The light reflected back into the backlight unit 60 is reflected back by the backlight unit 60, and then moves toward the reflective polarizing plate 50 in a state in which the polarized light is broken. Some of the light passes through the reflective polarizing plate 50, and the remainder of the light is reflected back to the backlight unit 60. The reflective polarizing plate 50 allows the light emitted from the backlight unit 60 to be reused.

Since the voltage is not applied to the electrical polarization control unit 40, the vertical linear polarized light W2 that is incident on the electrical polarization control unit 40 passes through the electrical polarization control unit 40 with an unchanged polarization direction. The vertical linear polarized light W3 that has passed through the electrical polarization control unit 40 passes through the liquid crystal display panel 30 and the color filter 20 (W4 and W5). Since the transmissive polarizing plate 10 allows only the vertical linear polarized light to pass therethrough, the vertical linear polarized light W5 having passed through the liquid crystal display panel 30 and the color filter 20 passes through the transmissive polarizing plate 10 in the same state. Accordingly, the user can see the images. The amount of light W6 that passes through the transmissive polarizing plate 10 may be adjusted by pixels by applying a voltage to the liquid crystal display panel 30. Since the color filter 20 includes the red color filter, the green color filter, and the white color filter, the second state improves the total brightness and the brightness of the red and green colors.

Finally, an operation of the transflective image display apparatus 1 in the third state will be described with reference to FIG. 5.

In the third state, the backlight unit 60 uses the blue light source. The backlight unit 60 uses the blue light source to reinforce the brightness of the blue color that is relatively small compared to the brightness of the red and green colors in the first and second states. Non-polarized blue light B1 is emitted from the blue light source of the backlight unit 60 to be incident on the reflective polarizing plate 50. Some polarized light of the non-polarized light B1 that is matched with the polarization direction of the reflective polarizing plate 50 passes through the reflective polarizing plate 50, and then moves toward the electrical polarization control unit 40. According to the present exemplary embodiment, since the reflective polarizing plate 50 allows only the vertical linear polarized light to pass therethrough, the light B2 that has passed through the reflective polarizing plate 50 is the vertical linear polarized light, and the horizontal linear polarized light of the non-polarized light B1 is reflected back to the backlight unit 60 by the reflective polarizing plate 50. The light reflected back into the backlight unit 60 is reflected back by the backlight unit 60, and then moves toward the reflective polarizing plate 50 in a state in which the polarized light is broken. Some of the light passes through the reflective polarizing plate 50, and the remainder of the light is reflected back to the backlight unit 60. The reflective polarizing plate 50 allows the light emitted from the backlight unit 60 to be reused.

Since the voltage is not applied to the electrical polarization control unit 40, the vertical linear polarized light B2 that is incident on the electrical polarization control unit 40 passes through the electrical polarization control unit 40 with an unchanged polarization direction. The vertical linear polarized light B3 that has passed through the electrical polarization control unit 40 passes through the liquid crystal display panel 30 and the color filter 20 in the same state (B4 and B5). Since the transmissive polarizing plate 10 allows only the vertical linear polarized light to pass therethrough, the vertical linear polarized light B5 having passed through the liquid crystal display panel 30 and the color filter 20 passes through the transmissive polarizing plate 10 in the same state so that the user can see the images. The amount of light B6 that passes through the transmissive polarizing plate 10 may be adjusted by pixels by applying a voltage to the liquid crystal display panel 30.

In the above exemplary description, the transflective image display apparatus 1 displays color images. Hereinafter, a case in which the transflective image display apparatus 1 displays black-and-white images according to an exemplary embodiment will be described.

In the case in which the transflective image display apparatus 1 displays the black-and-white images, pixels of the liquid crystal display panel 30 corresponding to the red and green color filters are set to prevent light from passing therethrough and only pixels corresponding to the white color filter operate, and as such, the transflective image display apparatus 1 operates in only the first and second states.

Figure 6:
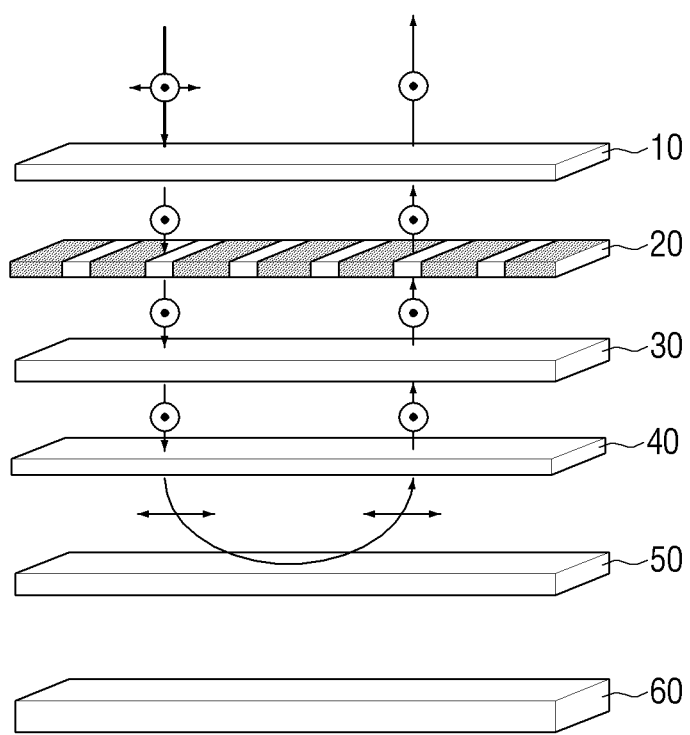
FIG. 6 is an exploded perspective view illustrating the transflective image display apparatus of FIG. 2 operating in a first state and in a black-and-white mode.
Figure 7:
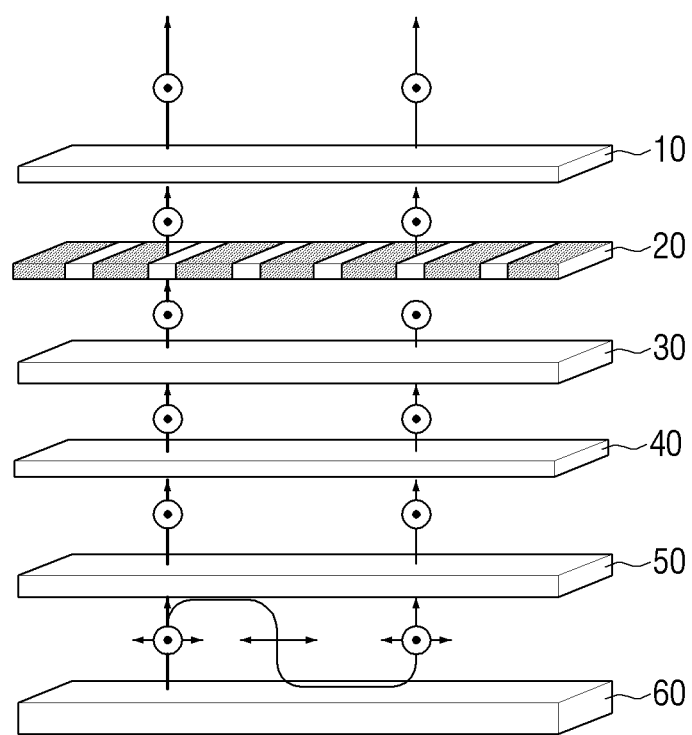
FIG. 7 is an exploded perspective view illustrating the transflective image display apparatus of FIG. 2 operating in a second state and in a black-and-white mode.

FIG. 6 is an exploded perspective view illustrating the transflective image display apparatus of FIG. 2 operating in a first state in a black-and-white mode, and FIG. 7 is an exploded perspective view illustrating the transflective image display apparatus of FIG. 2 operating in a second state in a black-and-white mode.

When the external light is strong, the transflective image display apparatus 1 operates in only the first state. When the external light is very weak or does not exist, the transflective image display apparatus 1 operates in only the second state. When the external light is weak, the transflective image display apparatus 1 may operate so that the first state and the second state are executed periodically with a certain duty ratio.

In FIG. 6, a process in which the external light is incident on the transmissive polarizing plate 10 and then is transmitted back out through the transmissive polarizing plate 10 is the same as the description with respect to FIG. 3; therefore, a detailed description thereof will be omitted. Also, in FIG. 7, a process in which the light emitted from the backlight unit 60 is transmitted out through the transmissive polarizing plate 10 is the same as the description with respect to FIG. 4; therefore, a detailed description thereof will be omitted.

While the exemplary embodiments of the present disclosure have been described, additional variations and modifications of the exemplary embodiments may occur to those skilled in the art once they learn of the basic inventive concepts. Therefore, it is intended that the appended claims shall be construed to include both the above exemplary embodiments and all such variations and modifications that fall within the spirit and scope of the inventive concepts.

What is claimed is:

1. A transflective image display apparatus comprising:
a transmissive polarizing plate;
a color filter disposed below the transmissive polarizing plate, the color filter comprising a white color filter and at least two of a red color filter, a green color filter, and a blue color filter;
a liquid crystal display panel disposed below the color filter;
an electrical polarization control unit disposed below the liquid crystal display panel;
a reflective polarizing plate disposed below the electrical polarization control unit;
a backlight unit disposed below the reflective polarizing plate, the backlight unit comprising a white light source and a light source configured to emit light corresponding to at least one of the red color filter, the green color filter, and the blue color filter which the color filter does not comprise; and
a controller configured to control the liquid crystal display panel, the electrical polarization control unit, and the backlight unit periodically in three states according to a predetermined condition,
wherein the controller is configured to adjust a duty ratio of a driving voltage of the three states according to the predetermined condition, and
wherein, in each of the three states, the controller applies a non-zero driving voltage to operate one of the electrical polarization control unit and the backlight unit such that the driving voltage of the three states is a non-zero voltage for each of the three states.

2. The transflective image display apparatus of claim 1, wherein
the controller is configured to control the transflective image display apparatus so that at least two states of the three states are executed periodically, the three states comprising:
1) a first state in which the electrical polarization control unit is operated so that incident polarized light is rotated by 90 degrees, the backlight unit does not emit light, and the liquid crystal display panel displays images,
2) a second state in which the electrical polarization control unit is not operated, the backlight unit emits white light, and the liquid crystal display panel displays images, and
3) a third state in which the electrical polarization control unit is not operated, the backlight unit emits light of a color corresponding to one of the red color filter, the green color filter, and the blue color filter which the color filter does not comprise, and the liquid crystal display panel displays images.

3. The transflective image display apparatus of claim 2, further comprising:
an illuminance sensor configured to measure brightness of a surrounding environment of the transflective image display apparatus and send a result of the measured brightness to the controller.

4. The transflective image display apparatus of claim 3, wherein
the controller is configured to adjust the duty ratio of the driving voltage of the first state, the second state, and the third state according to an amount of external light indicated by the result of the measured brightness that is measured by the illuminance sensor.

5. The transflective image display apparatus of claim 4, wherein
when the amount of the external light is equal to or greater than a first threshold, the controller is configured to control the transflective image display apparatus so that the first state and the third state are executed periodically.

6. The transflective image display apparatus of claim 4, wherein
when the amount of the external light is between a first threshold and a second threshold which is lower than the first threshold, the controller is configured to control the transflective image display apparatus so that the first state, the second state, and the third state are executed periodically.

7. The transflective image display apparatus of claim 4, wherein
when the amount of the external light is below a threshold, the controller is configured to control the transflective image display apparatus so that the second state and the third state are executed periodically.

8. The transflective image display apparatus of claim 2, wherein
the controller comprises a state setting member configured to set the duty ratio of the driving voltage of the first state, the second state, and the third state.

9. The transflective image display apparatus of claim 1, wherein
the color filter comprises a red color filter, a green color filter, and a white color filter, and the backlight unit comprises a blue light source and the white light source.

10. The transflective image display apparatus of claim 1, wherein
the color filter comprises a red color filter, a blue color filter, and a white color filter, and the backlight unit comprises a green light source and the white light source.

11. The transflective image display apparatus of claim 1, wherein
the color filter comprises a blue color filter, a green color filter, and a white color filter, and the backlight unit comprises a red light source and the white light source.

12. The transflective image display apparatus of claim 1, wherein
the color filter comprises a red color filter, a green color filter, a blue color filter, and a white color filter, and the backlight unit comprises the white light source.

13. The transflective image display apparatus of claim 12, wherein
the controller is configured to control the transflective image display apparatus so that two states of the three states are executed periodically, the two states comprising:
1) a first state in which the electrical polarization control unit is operated so that incident polarized light is rotated by 90 degrees, the backlight unit does not emit light, and the liquid crystal display panel displays images, and
2) a second state in which the electrical polarization control unit is not operated, the backlight unit emits white light, and the liquid crystal display panel displays images.

14. The transflective image display apparatus of claim 1, further comprising:
a lower transmissive polarizing plate disposed between the liquid crystal display panel and the electrical polarization control unit.

15. The transflective image display apparatus of claim 1, wherein
the backlight unit comprises a diffusion member and a bright enhancement film.

16. An image display apparatus, comprising:
a liquid crystal display (LCD) panel;
a backlight unit configured to selectively emit light towards the LCD panel;
a reflective polarizing plate disposed between the LCD panel and the backlight unit and configured to reflect light having a first polarization direction;
an electrical polarization control unit disposed between the reflective polarizing plate and the LCD panel and configured to selectively change a polarization direction of light passing towards the reflective polarizing plate from the LCD panel to the first polarization direction such that the light is reflected by the reflective polarizing plate back towards the LCD panel; and
a controller configured to control the LCD panel, the electrical polarization control unit, and the backlight unit periodically in three states according to a predetermined condition,
wherein the controller is configured to adjust a duty ratio of a driving voltage of the three states according to the predetermined condition, and
wherein, in each of the three states, the controller applies a non-zero driving voltage to operate one of the electrical polarization control unit and the backlight unit such that the driving voltage of the three states is a non-zero voltage for each of the three states.

17. The image display apparatus of claim 16, wherein the electrical polarization control unit is configured to selectively change the polarization direction of the light according to an amount of external light in a surrounding environment of the image display apparatus.

18. The image display apparatus of claim 17, wherein the electrical polarization control unit is configured to change the polarization direction of the light to have the first polarization direction when the amount of the external light is equal to or greater than a first threshold, and to maintain the polarization direction of the light when the amount of the external light is less than the first threshold.

19. The image display apparatus of claim 16, further comprising a transmissive polarizing plate disposed on a side of the LCD panel opposite the electrical polarization control unit and configured to change external light having no polarization into polarized light having a second polarization direction.

20. The image display apparatus of claim 19, wherein the first polarization direction comprises horizontal linear polarized light, and the second polarization direction comprises vertical linear polarized light.

21. The image display apparatus of claim 16, further comprising a color filter comprising a white color filter and two of a red color filter, a green color filter, and a blue color filter,
wherein the backlight unit is configured to emit light of a color corresponding to the one of the red color filter, the green color filter, and the blue color filter absent from the color filter.

* * * * *